United States Patent
Shin et al.

(10) Patent No.: US 7,500,156 B2
(45) Date of Patent: Mar. 3, 2009

(54) METHOD AND APPARATUS FOR VERIFYING MULTI-CHANNEL DATA

(75) Inventors: Jong Yoon Shin, Daejeon (KR); Je Soo Ko, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 361 days.

(21) Appl. No.: 11/417,980

(22) Filed: May 4, 2006

(65) Prior Publication Data

US 2007/0088991 A1    Apr. 19, 2007

(30) Foreign Application Priority Data

Sep. 28, 2005    (KR) ...................... 10-2005-0090732
Dec. 15, 2005    (KR) ...................... 10-2005-0124051

(51) Int. Cl.
*G11B 20/20*    (2006.01)
*G11B 20/14*    (2006.01)

(52) U.S. Cl. ...................................... 714/700; 714/798
(58) Field of Classification Search ........................ None
See application file for complete search history.

(56) References Cited

U.S. PATENT DOCUMENTS

| | | | |
|---|---|---|---|
| 6,285,313 B1 * | 9/2001 | Wahab et al. ................ 342/174 |
| 6,819,683 B2 | 11/2004 | Jones et al. | |
| 6,874,107 B2 | 3/2005 | Lesea | |
| 7,210,074 B2 * | 4/2007 | McAuliffe ................... 714/700 |
| 2002/0099451 A1 * | 7/2002 | Wang ............................. 700/4 |
| 2005/0111492 A1 * | 5/2005 | Kang et al. .................. 370/480 |
| 2005/0286661 A1 * | 12/2005 | Kwak .......................... 375/343 |

* cited by examiner

*Primary Examiner*—Cynthia Britt
*Assistant Examiner*—Dipakkumar Gandhi
(74) *Attorney, Agent, or Firm*—Ladas & Parry LLP

(57) ABSTRACT

A multi-channel data verifying apparatus and method are provided. The apparatus includes a receiver receiving N data channels and a deskew channel generated by sequentially extracting a predetermined data bit from the each of N data channels, and a deskew channel error detector detecting whether the deskew channel received by the receiver corresponds to an expected deskew channel generated and stored based on the test signal or generated based on the previously received deskew channel. Accordingly, data channels, a deskew channel and the entire data capacity can be verified and thus the cause of a problem in the transmission and reception of multi-channel data can be identified in advance.

18 Claims, 6 Drawing Sheets excellent# METHOD AND APPARATUS FOR VERIFYING MULTI-CHANNEL DATA

CROSS-REFERENCE TO RELATED PATENT APPLICATION

This application claims the benefit of Korean Patent Application Nos. 10-2005-0090732, filed on Sep. 28, 2005 and 10-2005-0124051, filed on Dec. 15, 2005, in the Korean Intellectual Property Office, the disclosure of which are incorporated herein in their entirety by reference.

BACKGROUND OF THE INVENTION

1. Field of the Invention

The present invention relates to a multi-channel data verifying apparatus including a skew compensating function in a digital communication system and a method thereof.

2. Description of the Related Art

As capacity of data to be transmitted increases, low-rate parallel channel data is transmitted through a high-rate serial channel to reduce the number of pins, and the size of chips. However, because demands for transmission of data having capacity exceeding serial channel data capacity increase, studies on a multi-channel transmitting high-rate serial channel data in parallel have been performed In multi-channel data communication, compensation of a skew, generated when channels have different delays, becomes more important. Due to a skew in multiple channels, a receiver cannot receive data transmitted from a transmitter in a correct order. When data is transmitted at a high rate, particularly, a delay time may be easily varied with the state of each channel. Accordingly, a method for actively compensating the skew in the multiple channels is required.

SUMMARY OF THE INVENTION

The present invention provides a multi-channel data verifying apparatus capable of verifying each data channel as well as a deskew channel and the entire data transmitted.

According to an aspect of the present invention, there is provided a deskew channel verifying apparatus including a receiver receiving N data channels and a deskew channel generated by sequentially extracting a predetermined data bit from the each of N data channels; and a deskew channel error detector detecting whether the deskew channel received by the receiver corresponds to an expected deskew channel previously generated and stored based on the test signal or preestimated based on the previously received deskew channel According to another aspect of the present invention, there is provided an apparatus for verifying multi-channel data including: a receiver receiving N data channels generated based on a test signal and a deskew channel generated by sequentially extracting a predetermined data bit from the each of N data channels; a compensator comparing the N data channels received by the receiver to the deskew channel to compensate a skew generated in each of the N data channels; and a compensation error detector detecting whether the N data channels received by the compensator respectively correspond to the N data channels generated and stored based on the input signal if the input signal is a test signal.

The apparatus for verifying multi-channel data may further a demapper unit converting the N data channels skew-compensated by the compensator to an output signal.

The apparatus for verifying multi-channel data may further include comprising a conversion error detector detecting whether the output signal corresponds to an preestimated output signal based on the test signal.

According to another aspect of the present invention, there is provided a channel error detecting method including: (a)receiving N data channels generated based on a test signal and a deskew channel generated by sequentially extracting a predetermined data bit from the each of N data channels; and (b) detecting whether the deskew channel received by the receiver corresponds to a deskew channel previously generated and stored based on the input signal or preestimated based on the previously received deskew channel.

According to another aspect of the present invention, there is provided a method for verifying multi-channel data including: (a) receiving N data channels generated based on a test signal and a deskew channel generated by sequentially extracting a predetermined data bit from the N data channels; (b) compensating a skew generated in each of the N data channels by comparing the N data channels received by the receiver to the deskew channel; and (c) detecting whether the received N data channels respectively correspond to N data channels generated and stored when the input signal is a test signal.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
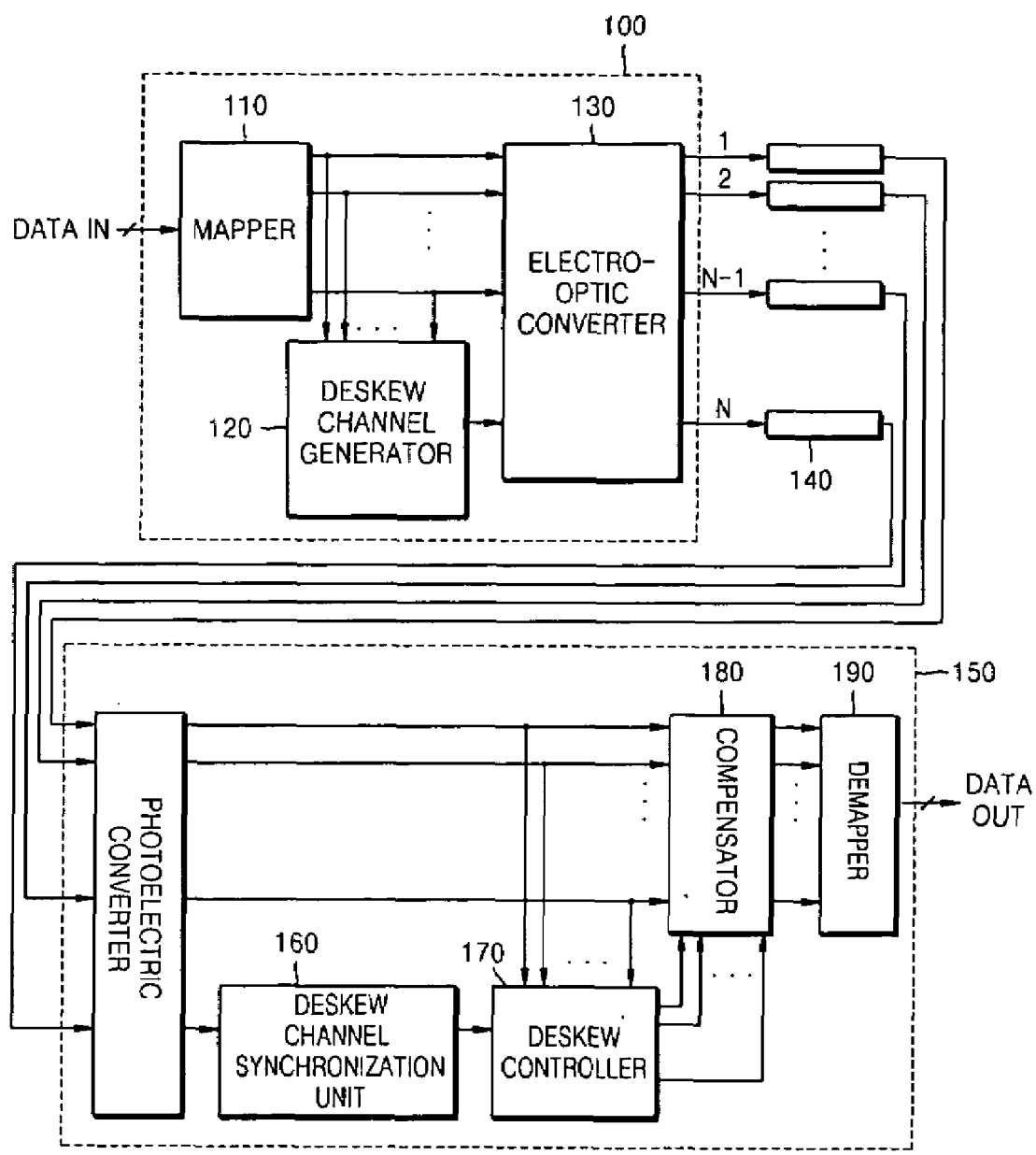
FIG. 1 is a block diagram of a multi-channel data communication system including a skew compensating function.

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art. Throughout the drawings, like reference numerals refer to like elements.

FIG. 1 is a block diagram of a multi-channel data communication system including a skew compensating function. The multi-channel data communication system of FIG. 1 solves a skew compensation problem.

Referring to FIG. 1, N data channels are generated based on input data. A deskew channel generator sequentially extracts a predetermined data bit from the respective N data channels to generate a deskew channel. A deskew channel synchronization unit 160 and a deskew controller 170 compare each of the N data channels to the deskew channel to measure the quantity of skew generated in the N data channels through transmission networks 140 such as wires, wireless and optical fibers. A compensator 180 compensates the skew using the quantity of skew in the N data channels measured by the deskew controller 170.

A transmission network uses an electricity-medium converter and a medium-electricity converter to convert electricity in a medium used therein. When a printed circuit board is used as a transfer medium, a transmitter 100 and a receiver 150 are constructed of integrated circuits. When wavelength division multiplexing is used to transmit and receive multi-channel data through an optical fiber, an electro-optic converter 130 is used as the electricity-medium converter and a photoelectric converter is used as the medium-electricity converter.

The transmitter 100 for transmitting multi-channel data includes a mapper 110 for converting application data to be transmitted into the N data channels, the deskew channel generator 120 for generating the deskew channel using the N data channels, and the electro-optic converter 130 for converting N electric data into transfer media.

The receiver 150 for receiving the multi-channel data includes a photoelectric converter for converting the transfer media into electric data, the deskew channel synchronization unit 160 for detecting a frame start point of the deskew channel, the deskew controller 170 for calculating and controlling the quantity of skews of the N data channels referring to the deskew channel, a compensator 180 for compensating a delay in response to a control signal received from the deskew controller 170, and a demapper 190 for converting the N data channels into application data of a final user.

The aforementioned multi-channel communication system having the skew compensating function compensates skews of the N data channels, generated after transmission, receiving the deskew channel generated by extracting data of the N data channels before transmission. However, the skew compensating function of the multi-channel communication system may not be properly executed when the deskew channel has a trouble because the multi-channel communication system completely depends on the deskew channel. According to circumstances, transmission failure may happen at the entire multi-channel.

Furthermore, an error generation rate increases as a deskew channel rate increases. An error occurred in the process of extracting data from the N data channels may result in a failure in the deskew control operation even if the function of the deskew channel synchronization unit 160 of the receiver 150, which detects the frame start point of the deskew channel, is normally operated.

Furthermore, even when reliability of the deskew channel is guaranteed, an error may be occurred in each data channel as the transmission rate of each data channel increases. Moreover, an error may be occurred even in the entire data transmitted as an internal data processing rate increases.

As various causes described above, the probability of an error occurred in each channel increases as the transmission rate of each channel increases, and thus it is difficult to find the cause of the generation of errors in multiple channels. Accordingly, a system for verifying the multiple channels is required.

Figure 2:
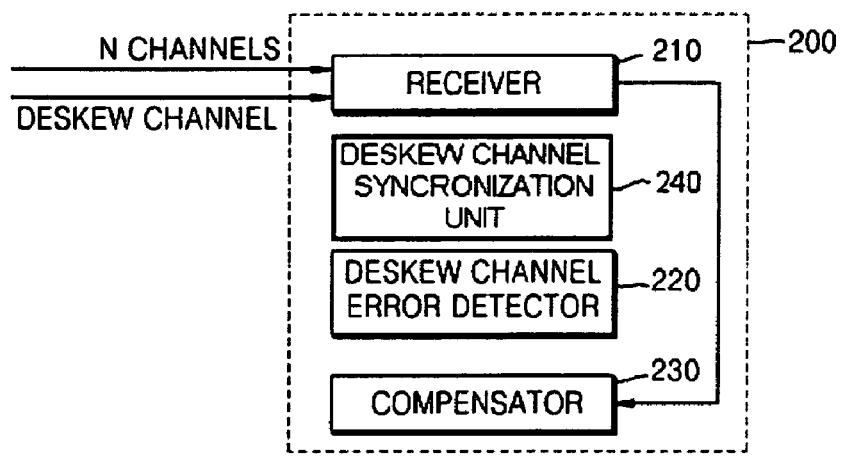
FIG. 2 is a block diagram of a deskew channel verifying apparatus according to an embodiment of the present invention.

FIG. 2 is a block diagram of a deskew channel verifying apparatus 200 according to an embodiment of the present invention. The deskew channel verifying apparatus 200 includes a receiver 210, a deskew channel error detector 220, a compensator 230 and a deskew channel synchronization unit 240.

Figure 5:
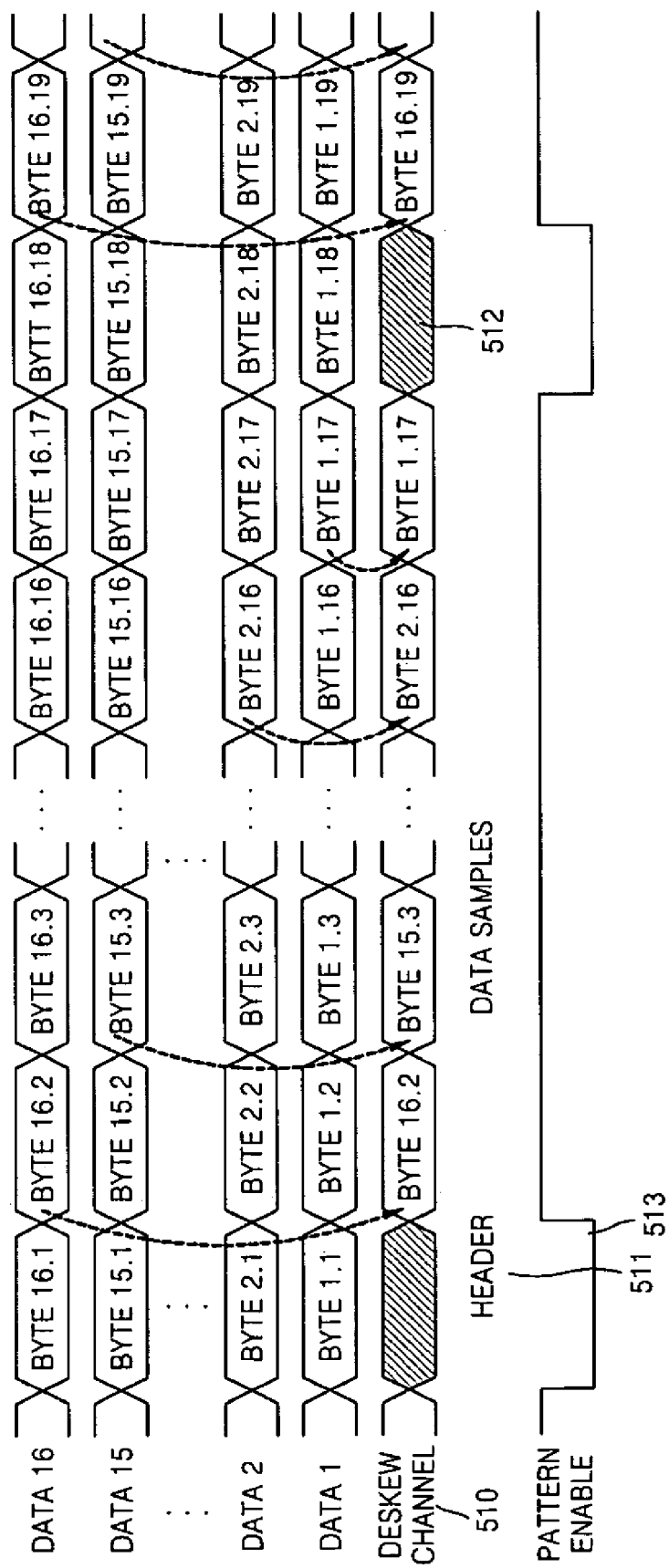
FIG. 5 is a timing diagram of a deskew channel according to an embodiment of the present invention.

The receiver 210 receives N data channels generated based on a test signal and a deskew channel generated by sequentially extracting a predetermined data bit from the N data channels in a transmitter (referring to FIG. 5). The deskew channel error detector 220 detects whether the deskew channel received by the receiver 210 corresponds to an expected deskew channel previously generated and stored based on the test signal or generated based on the received deskew channel.

Specifically, the receiver 210 receives the N data channels generated based on a test signal such as a pseudo-random binary sequence (PRBS) signal or a cyclical redundancy check (CRC) signal and the deskew channel generated by sequentially extracting a predetermined data bit from the N data channels in the transmitter. The deskew channel error detector 220 generates and stores a test signal such as a PRBS signal or a CRC signal identical to the test signal which is put in the N data channels of the transmitter or generates an expected deskew channel signal based on a previous deskew channel received by the receiver 210 including the test signal such as a PRBS signal or a CRC signal. The deskew channel error detector 220 detects whether the previously stored or expected deskew channel signal corresponds to the deskew channel received by the receiver 210. If the deskew channel consists of headers and data samples, the deskew channel error detector 220 detects whether the expected deskew channel signals corresponds to the deskew channel received by the receiver 210 with classifying both headers and data samples by pattern enable signal transferred at a deskew channel synchronization unit 240. The deskew channel error detector 220 will be explained with reference to FIG. 4 in more detail.

The compensator 230 compares the N data channels received by the receiver 210 to the deskew channel received by the receiver 210, to compensate a skew generated in each of the N data channels.

Figure 3:
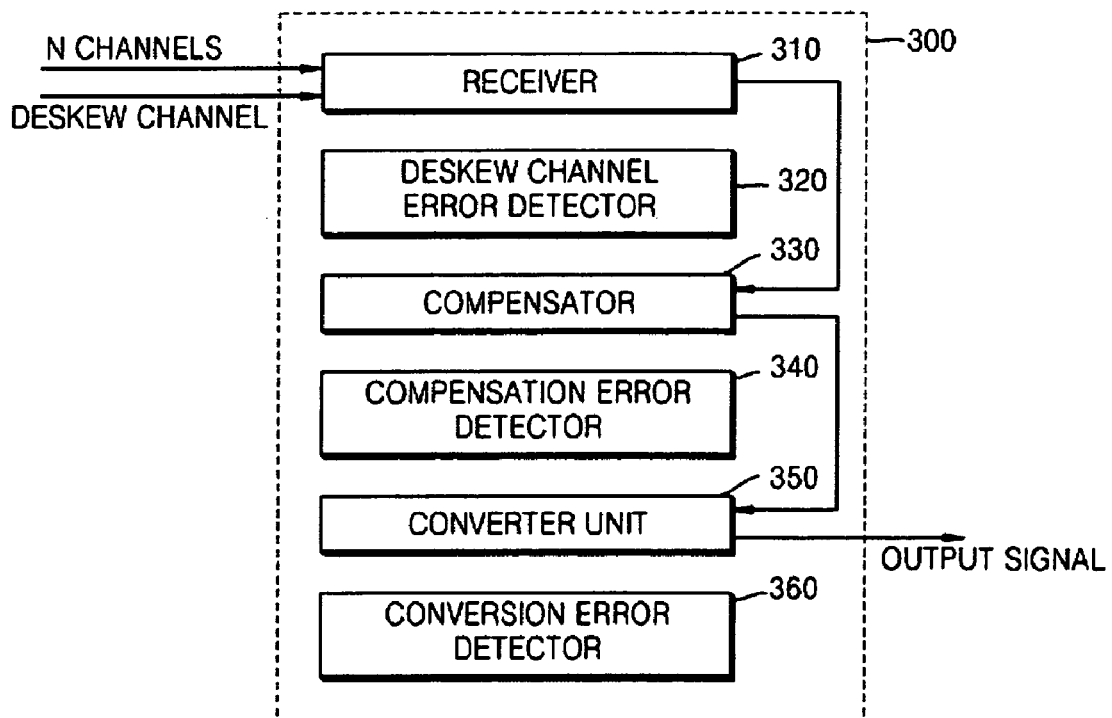
FIG. 3 is a block diagram of a multi-channel data verifying apparatus according to an embodiment of the present invention.

FIG. 3 is a block diagram of a multi-channel data verifying apparatus 300 according to an embodiment of the present invention. The multi-channel data verifying apparatus 300 includes a receiver 310, a deskew channel error detector 320, a compensator 330, a compensation error detector 340, a demapper 350 and a conversion error detector 360.

The receiver 310 receives N data channels and a deskew channel transmitted through a transmission network. The transmitted deskew channel is generated by sequentially extracting a predetermined data bit from the N data channels in the transmitter. When a test signal such as a PRBS or CRC signal is utilized for the input signal of the N data channels to detect whether errors are generated when the deskew channel and the N data channels are transmitted and received, the deskew channel error detector 320 detects whether the deskew channel received by the receiver 310 corresponds to an expected deskew channel previously generated and stored based on the test signal or generated based on the previous received deskew channel and a predetermined test signal generation rule. Thus, the deskew channel error detector 320 can detect whether an error is occurred at the deskew channel transmitted and received through the transmission network.

The deskew channel received at the deskew channel error detector 320 from the receiver 310 is generated by sequentially extracting the predetermined data bit from the N data channels in the transmitter. Thus, when it is detected that an error is occurred only in a specific bit of the received deskew channel by comparing the estimated deskew channel to the received deskew channel in the deskew channel error detector 320, it can be doubted that the operation of extracting a data bit of a specific channel is improperly performed in a deskew channel generator (not shown) of a transmitter (not shown).

The compensator 330 performs a function identical or similar to that of the compensator 230 of FIG. 2. That is, the compensator 330 compares the received N data channels to the received deskew channel in a predetermined data bit to compensate a skew generated in each of the N data channels.

When a deskew controller (not shown) is disabled and a test signal such as a PRBS or CRC signal is utilized for the input signal of the N data channels, the compensation error detector 340 detects whether each of the N data channels that are not compensated by the compensator 330 correspond to each of the expected N data channels respectively generated and stored based on the test signal. That is, the compensation error detector 340 verifies that each of the N data channels are transmitted and received without an error. In this case, the test signal can use a PRBS signal or a CRC signal. However, the test signal is not limited to the PRBS or CRC signal.

When the deskew controller is enabled and a test signal is utilized for the input signal of the N data channels, the compensation error detector 340 detects whether the N data channels that are compensated by the compensator 330 correspond to the expected N data channels generated and stored based on the test signal. That is, after the deskew channel error detector 320 verifies the deskew channel and each of the N data channels are transmitted and received without an error, the compensation error detector 340 detects whether compensation of the N data channels is properly carried out. In this case, the test signal can use a PRBS or CRC signal.

The demapper 350 converts the N data channels, compared to the deskew channel and then skew-compensated, into an output data signal. The conversion error detector 360 detects whether the output signal converted by the demapper 350 is a proper signal. For this, the conversion error detector 360 compares the output signal to an estimated output signal generated based on the test signal.

Figure 4:
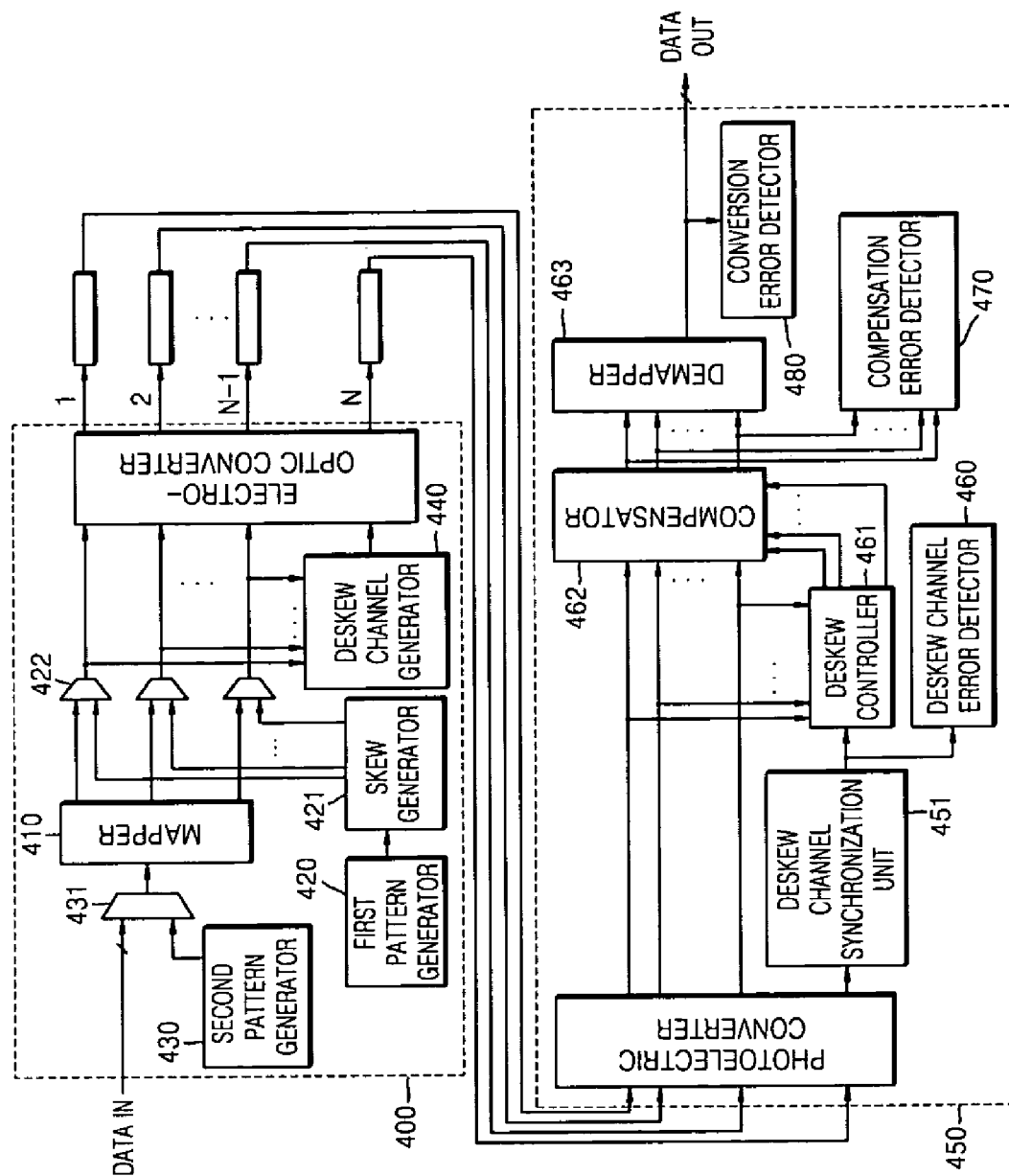
FIG. 4 illustrates the detailed constitution of the multi-channel data verifying apparatus according to an embodiment of the present invention.

FIG. 4 illustrates the detailed constitution of the multi-channel data verifying apparatus according to an embodiment of the present invention. The multi-channel data verifying apparatus includes a multi-channel transmitter 400 and a multi-channel receiver 450. The multi-channel transmitter 400 includes a mapper 410, a first pattern signal generator 420, a second pattern signal generator 430, a skew generator 421, first and second selectors 422 and 431, a deskew channel generator 440, and an electro-optic converter.

The mapper 410 converts application data to be transmitted into N data channels. The deskew channel generator 440 generates a deskew channel based on the generated N data channels. The N data channels and the deskew channel are transmitted to the multi-channel receiver 450 through the electro-optic converter and a transmission network.

To detect whether the N data channel signal and the deskew channel signal are transmitted to the receiver 450 without an error, the skew of N data channel is compensated properly, and the entire application data is extracted without an error, the multi-channel transmitter 400 uses the first and second pattern signal generators 420 and 430.

The first pattern signal generator 420 generates a test signal using a pattern signal such as a PRBS or CRC signal in the multi-channel transmitter 400 to detect an error in the deskew channel, errors in the N data channels and errors in the skew-compensated N data channels in the multi-channel receiver 450. The first pattern signal generator 420 transmits the generated test signal to the skew generator 421.

The skew generator 421 artificially generates a skew in each of N data channel and transmits the N skew-generated data channels to the first selector 422 respectively.

The first selector 422 selects one of both the N data channels generated based on the test signal and the N data channels generated by the mapper 410. The selected N data channels and the deskew channel generated by the deskew channel generator 440 are transmitted to the multi-channel receiver 450 through the electro-optic converter.

The second pattern signal generator 430 generates a PRBS or CRC signal as a test signal for detecting an error in the entire data and transmits the generated signal to the second selector 431. The second selector 431 selects one of the test signal and the application data signal and transmits the test signal to the mapper 410.

The mapper 410 converts the signal selected by the second selector 431 into N data channels thereto. The N data channels and the deskew channel generated by the deskew channel generator 440 are transmitted to the multi-channel receiver 450 via the electric-optic converter.

The multi-channel receiver 450 includes a photo-electric converter, a deskew channel synchronization unit 451, a deskew channel error detector 460, a compensation error detector 470, a conversion error detector 480, a deskew controller 461, a compensator 462, and a demapper 463. The multi-channel receiver 450 receives the N data channels and the deskew channel transmitted from the multi-channel transmitter 400 via a transfer medium. The N data channels and the deskew channel received by the multi-channel receiver 450 are respectively transmitted to the compensator 462 and the deskew channel synchronization unit 451.

The deskew channel synchronization unit 451 detects a predetermined frame header of the deskew channel or detects the start point of the deskew channel using a variable frame method through CRC. The deskew controller 461 compares data extracted from each of the N data channels to data of the deskew channel, received by the deskew channel synchronization unit 451, to measure the quantity of a skew of each of the N data channels.

The compensator 462 compensates the skew about each of the N data channels, measured by the deskew controller 461. The demapper 463 converts the skew-compensated N data channels into an output data signal and transmits the output data signal to a final user.

The multi-channel receiver 450 includes the deskew channel error detector 460, compensation error detector 470 and conversion error detector 480 in order to detect errors generated when the deskew channel, data channels, skew-compensated data channels and entire data are transmitted and received.

The deskew channel error detector 460 detects whether an error in the deskew channel is occurred while the deskew channel is transmitted to the multi-channel receiver 450 via the transmission network. That is, the deskew channel error detector 460 compares an expected deskew channel previously generated and stored based on the test signal to the deskew channel transmitted from the transmitter 400 to detect an error in the deskew channel. As an alternative way, the deskew channel error detector 460 extracts the test signal from the deskew channel generated based on the test signal received by the receiver and applies a test signal generation rule used by the first pattern signal generator 420 to the extracted test signal to generate an estimated test signal to be extracted. Then, the deskew channel error detector 460 compares the generated estimated test signal to the next test signal extracted from the deskew channel received by the receiver 450 to detect an error. Subsequently, the deskew channel error detector 460 applies the test signal generation rule to the extracted test signal to generate an estimated test signal to be compared to the next test signal to be extracted.

The compensation error detector 470 detects whether an error of the N data channels is occurred while the N data channels are transmitted to the multi-channel receiver 450 via the transmission network. The compensation error detector 470 measures not only error rates of respective N data channels but also an error rate of the entire data channel. That is, the compensation error detector 470 detects whether the skew-uncompensated N data channels respectively correspond to expected N data channels generated and stored based on the test signal as well as whether the skew-compensated entire data correspond to the expected entire data generated and stored based on the test signal. The conversion error detector 480 detects whether an error of the output signal converted from the N compensated channels by the demapper 463 is occurred, comparing the output signal to the test signal.

FIG. 5 is a timing diagram of a deskew channel according to an embodiment of the present invention. Referring to FIG. 5, 16 data channels (N=16) are used. A predetermined number of data bits are sequentially extracted from the 16 data channels to generate the deskew channel. FIG. 5 shows that 1-byte data is sequentially extracted from the 16 data channels.

When data is extracted in the unit of bit or byte, the data extracted from the respective data channels have an order of BYTE 16.2, BYTE 15.3, BYTE 14.4, . . . , BYTE 2.16 and BYTE 1.17 as shown in FIG. 5. The deskew channel 510 having this data order in the deskew channel generator 440 is generated and the 16 data channels are respectively compared to the deskew channel 510 in the deskew controller 461 to detect a skew of the 16 data channels.

The deskew channel synchronization unit 451 generates a pattern enable signal 513 and transmits the pattern enable signal 513 to the deskew channel error detector 460 such that headers 511 and 512 of the deskew channel 510 are not compared to a test signal such as a PRBS or CRC signal but are compared to expected headers of the deskew channel. The deskew channel error detector 460 compares the data of the received deskew channel to a predetermined test signal when the pattern enable signal 513 is at a high level. When a header that can be expected is inserted into the deskew channel and the pattern enable signal 513 is at a low level, an expected header is compared to the header of the deskew channel. Thus, the deskew channel error detector 460 can verify the data and headers of the deskew channel simultaneously.

Figure 6:
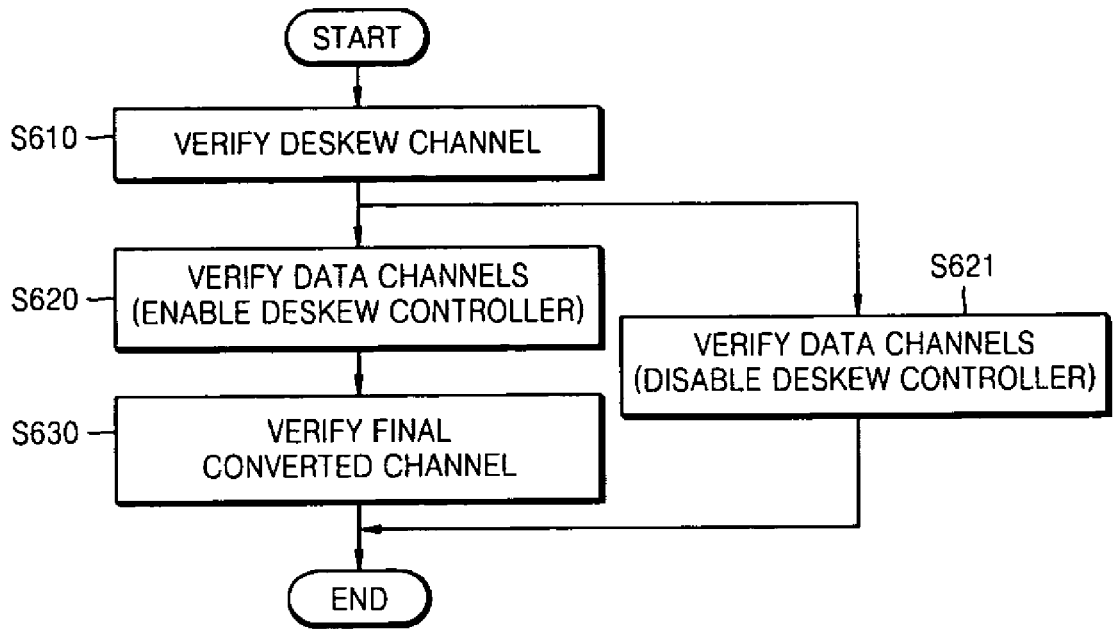
FIG. 6 is a flow chart showing a verification process according to an embodiment of the present invention.

FIG. 6 is a flow chart showing a verification process according to an embodiment of the present invention. The deskew channel error detector 460 of FIG. 4 detects whether the deskew channel has an error by using the test signal generated by the first pattern signal generator 420 in the step S610. When an error is not detected from the deskew channel, the compensation error detector 470 detects whether there is an error in each of the N data channels and there is an error in the entire data transmitted by the N data channels by using the test signal generated by the first pattern signal generator 420 in the steps S620 and S621. When the deskew controller 461 of FIG. 4 is disabled, an error is detected from the N data channels. When the deskew controller 461 of FIG.4 is enabled, there is an error in the entire data transmitted by the N data channels. Finally, the conversion error detector 480 detects whether the output signal converted from the N compensated channels has an error based on the signal generated by the second pattern signal generator 430 in the step S630.

Figure 7:
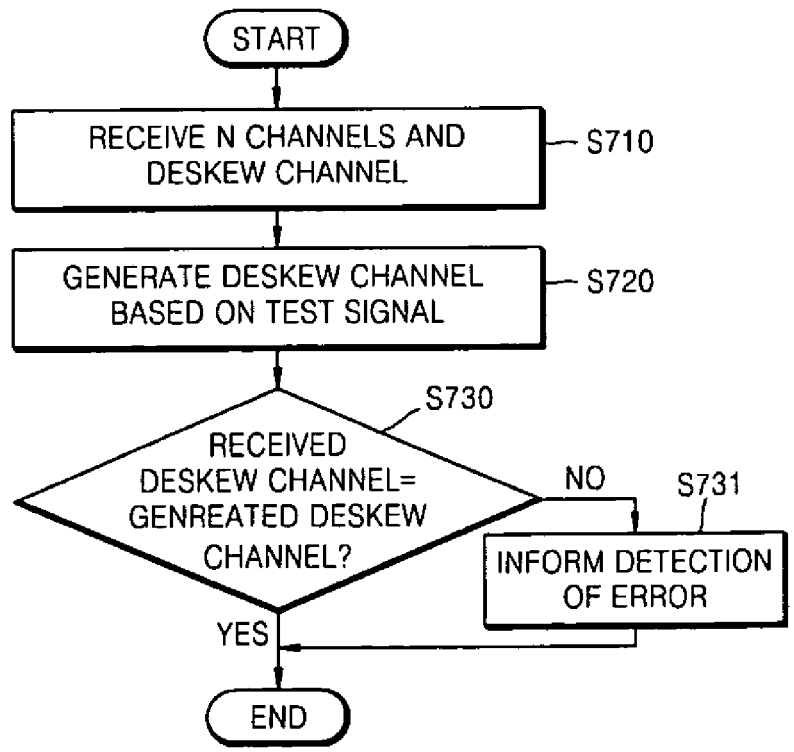
FIG. 7 is a flow chart showing a deskew channel verification process according to an embodiment of the present invention.

FIG. 7 is a flow chart showing a deskew verification process according to an embodiment of the present invention. Referring to FIG. 7, N data channels and a deskew channel generated based on data bits respectively extracted from the N data channels in the transmitter are received in order to detect whether an error is generated in the transmitted deskew channel in the step S710.

An expected deskew channel is generated based on the previously received deskew channel or generated based on a previously stored test signal in the step S720. When the expected deskew channel does not correspond to the received deskew channel, a user is informed that an error is generated in the deskew channel the steps S730 and S731.

Figure 8:
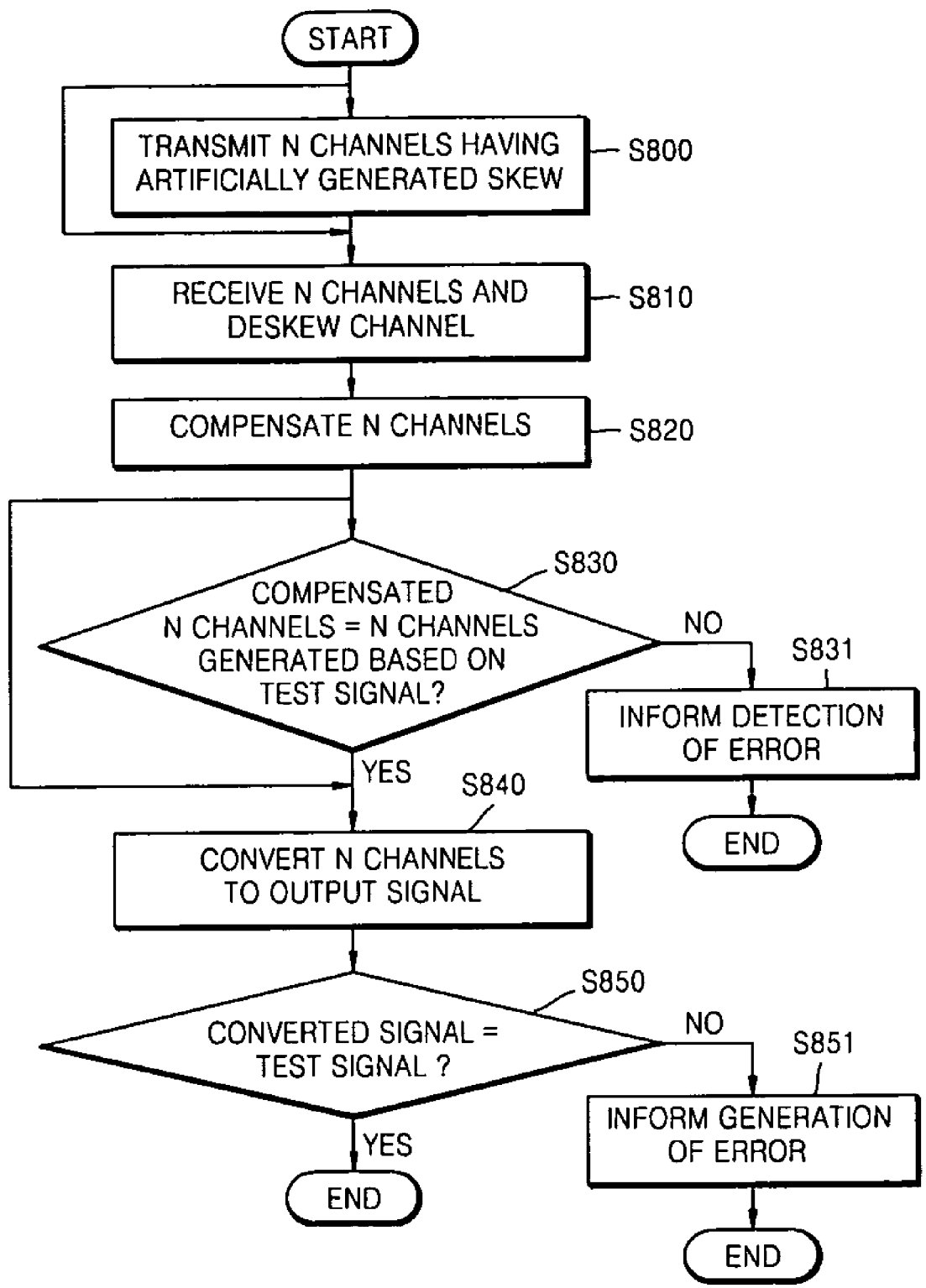
FIG. 8 is a flow chart showing a multi-channel verification process according to an embodiment of the present invention.

FIG. 8 is a flow chart showing a multi-channel verification process according to an embodiment of the present invention. Referring to FIG. 8, N data channels and a deskew channel generated based on data bits respectively extracted from the N data channels in the transmitter are received in order to detect whether an error is generated when each of the N data channels and the entire N data channel signals are transmitted and received in the step S810. A skew can be artificially generated in each of the N data channels in th skew generator 421 in the step S800 to measure the performance of the deskew controller.

The skew generated in each of the N data channels through the transmission network is compensated based on the received deskew channel in the step S820. It is detected whether the skew-compensated N data channels correspond to the expected N data channels generated based on a test signal and, when the skew-compensated N data channels do not correspond to the estimated N data channels, a user is informed that an error is detected at the N received data channels in the step S831. The deskew controller 461 is disabled to detect an error in each of the transmitted and received N data channels. The deskew controller 461 is enabled to detect an error in the entire data transmitted by the N data channels.

To verify the deskew performance of the deskew controller 461, a skew is artificially inserted into each of the N data channels in the skew generator 421 when the N data channels are generated based on the test signal in the step S800. In this case, the quantity of skew that can be compensated by the deskew controller 461 can be measured by detecting whether the error is generated in the transmitted entire data.

When any error is not detected, the compensated N data channels are converted into an output signal in the step S840. Then, the output signal is compared to the input test signal to detect an error generated when the N data channels are converted into the output signal in the steps S850 and S851.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

The multi-channel data verifying apparatus and method of the present invention can verify data channels and a deskew channel when high-rate large-capacity data is transmitted through multiple channels. Thus, the precise location of a problem in the transmission and reception of multi-channel data can be identified in advance. Particularly, multiple channels can be effectively verified because they depend on the deskew channel for compensating the skew of data channels. Furthermore, when the multi-channel data verifying apparatus of the present invention is used in FPGA, only a final user data route can be designed after a built-in test and thus additional verification cost is not required.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claim is:

1. A deskew channel verifying apparatus comprising:
   a receiver receiving N data channels and receiving a deskew channel, the deskew channel generated by sequentially extracting a predetermined data bit from the each of N data channels; and
   a deskew channel error detector detecting whether the deskew channel received by the receiver corresponds to an expected deskew channel previously generated and stored based on a test signal or preestimated based on a previously received deskew channel such that the generation of the deskew channel can be verified, wherein when the deskew channel includes both data and headers the deskew channel error detector verifies both the data and the headers of the deskew channel simultaneously.

2. The deskew channel verifying apparatus of claim 1, further comprising a compensator comparing the N data channels received by the receiver to the received deskew channel to compensate a skew generated in each of the N data channels.

3. The deskew channel verifying apparatus of claim 1, when an input signal is the test signal, a skew is added to each of N data channels when generating N data channels based on the test signal.

4. The deskew channel verifying apparatus of claim 1, wherein the test signal includes one of a Pseudo-random binary sequence (PRBS) signal and a cyclical redundancy check (CRC) signal.

5. An apparatus for verifying multi-channel data comprising:
   a receiver receiving N data channels generated based on a test signal and a deskew channel generated by sequentially extracting a predetermined data bit from the each of N data channels;
   a deskew controller for controlling a compensator;
   the compensator comparing the N data channels received by the receiver to the deskew channel to compensate a skew generated in each of the N data channels when the deskew controller is enabled, and not compensating the N data channels received by the receiver when the deskew controller is disabled; and
   a compensation error detector both detecting whether the N data channels compensated by the compensator respectively correspond to N data channels generated and stored based on an input signal when the input signal is the test signal, and detecting whether the N data channels not compensated by the compensator respectively correspond to the N data channels generated and stored based on the input signal when the input signal is the test signal.

6. The apparatus of claim 5, further comprising a deskew channel error detector detecting whether the deskew channel received by the receiver corresponds to a deskew channel previously generated and stored based on the test signal or preestimated based on a previously received deskew channel such that the generation of the deskew channel can be verified, wherein when the deskew channel includes both data and headers the deskew channel error detector verifies both the data and the headers of the deskew channel simultaneously.

7. The apparatus of claim 6, wherein a skew is added to each of the N data channels when the N data channels are generated based on the test signal.

8. The apparatus of claim 5, further comprising a demapper unit converting the N data channels skew-compensated by the compensator to an output signal.

9. The apparatus of claim 8, further comprising a conversion error detector detecting whether the output signal corresponds to a preestimated output signal based on the test signal.

10. A deskew channel error detecting method comprising:
    receiving N data channels generated based on a test signal and a deskew channel generated by sequentially extracting a predetermined data bit from the each of N data channels; and
    detecting whether the deskew channel received by the receiver corresponds to a deskew channel previously generated and stored based on an input signal or preestimated based on a previously received deskew channel such that the generation of the deskew channel can be verified,
    wherein when the deskew channel includes both data and headers the both the data and the headers of the deskew channel are verified simultaneously.

11. The method of claim 10, further comprising the step of comparing the received N data channels to the deskew channel to compensate a skew generated in each of the N data channels.

12. The method of claim 10, wherein a skew is added to each of the N data channels when a test signal is input to each of the N data channels.

13. The method of claim 10, wherein the test signal includes at least one of a PRBS signal and a CRC signal.

14. A method for verifying multi-channel data comprising:
    receiving N data channels generated based on a test signal and a deskew channel generated by sequentially extracting a predetermined data bit from the N data channels;
    compensating a skew generated in each of the N data channels by comparing the N data channels received by a receiver to the deskew channel when a deskew controller is enabled, and not compensating the N data channels when the deskew controller is disabled; and
    detecting whether the compensated N data channels respectively correspond to N data channels generated and stored when an input signal is the test signal, and detecting whether the not compensated N data channels respectively correspond to the N data channels generated and stored when the input signal is the test signal.

15. The method of claim 14, further comprising the step of detecting whether the deskew channel received by the receiver corresponds to a deskew channel previously generated and stored based on the test signal or preestimated based on a previously received deskew channel.

16. The method of claim 15, wherein when the input signal is the test signal, a skew is added to each of the N data channels when generating N data channels based on the test signal.

17. The method of claim 14, further comprising the step of converting the skew-compensated N data channels to an output signal.

18. The method of claim 17, further comprising the step of detecting whether the output signal corresponds to the test signal.

* * * * *